(12) United States Patent
Hosoya et al.

(10) Patent No.: US 8,062,794 B2
(45) Date of Patent: Nov. 22, 2011

(54) POSITIVE ACTIVE MATERIAL AND NONAQUEOUS ELECTROLYTE SECONDARY BATTERY PRODUCED USING THE SAME

(75) Inventors: Yosuke Hosoya, Fukushima (JP); Yoshikatsu Yamamoto, Fukushima (JP)

(73) Assignee: Sony Corporation, Tokyo (JP)

(*) Notice: Subject to any disclaimer, the term of this patent is extended or adjusted under 35 U.S.C. 154(b) by 662 days.

(21) Appl. No.: 10/821,589

(22) Filed: Apr. 9, 2004

(65) Prior Publication Data

US 2004/0253518 A1    Dec. 16, 2004

(30) Foreign Application Priority Data

Apr. 11, 2003  (JP) ................. P2003-108070

(51) Int. Cl.
  *H01M 4/58* (2010.01)
  *H01M 4/62* (2010.01)
  *H01M 4/02* (2010.01)
  *H01M 10/05* (2010.01)
(52) U.S. Cl. ............... 429/232; 429/231.1
(58) Field of Classification Search .......... 429/232, 429/231.1
See application file for complete search history.

(56) References Cited

U.S. PATENT DOCUMENTS

| | | | | |
|---|---|---|---|---|
| 4,668,594 A | * | 5/1987 | Yamaura et al. | 429/231.5 |
| 5,958,281 A | * | 9/1999 | Takada et al. | 429/305 |
| 6,475,663 B1 | * | 11/2002 | Mohwald et al. | 429/129 |
| 2002/0127473 A1 | * | 9/2002 | Ooya et al. | 429/232 |
| 2002/0136955 A1 | * | 9/2002 | Park et al. | 429/231.1 |
| 2002/0141937 A1 | * | 10/2002 | Howard et al. | 423/599 |
| 2004/0058245 A1 | * | 3/2004 | Fujimoto et al. | 429/231.95 |
| 2005/0153205 A1 | * | 7/2005 | Hisashi et al. | 429/232 |

FOREIGN PATENT DOCUMENTS

| | | |
|---|---|---|
| JP | 07-235292 | 9/1995 |
| JP | 08-222219 | 8/1996 |
| JP | 11-067209 | 3/1999 |
| JP | 11-283623 | 10/1999 |
| JP | 2000-149948 | 5/2000 |
| JP | 2000-149950 | 5/2000 |
| JP | 2001015101 A * | 1/2001 |
| JP | 2002-164053 | 6/2002 |
| JP | 2002373643 A * | 12/2002 |

OTHER PUBLICATIONS

IPDL Machine Translation of JP 2002-373643A.*

* cited by examiner

*Primary Examiner* — Gregg Cantelmo
(74) *Attorney, Agent, or Firm* — SNR Denton US LLP

(57) ABSTRACT

A positive active material is composed of particles of a compound oxide of lithium and a transition metal. This compound oxide has a layered structure. A coating layer of an inorganic compound and a carbonaceous material is formed on at least part of each surface of the particles. The inorganic compound is a lithium compound. The weight ratio of the inorganic compound to the carbonaceous material ranges between 99:1 and 60:40. The weight ratio of the particles to the coating layers ranges between 98:2 and 70:30.

4 Claims, 2 Drawing Sheets

POSITIVE ACTIVE MATERIAL AND NONAQUEOUS ELECTROLYTE SECONDARY BATTERY PRODUCED USING THE SAME

RELATED APPLICATION DATA

The present application claims priority to Japanese Application(s) No(s). P2003-108070 filed Apr. 11, 2003, which application(s) is/are incorporated herein by reference to the extent permitted by law.

BACKGROUND OF THE INVENTION

1. Field of the Invention

The present invention relates to positive active materials composed of a compound oxide of lithium and a transition metal. This compound oxide has a layered structure. The present invention also relates to nonaqueous electrolyte secondary batteries produced using the positive active materials. In particular, the present invention relates to a positive active material having excellent high-temperature characteristics and a nonaqueous electrolyte secondary battery produced using the positive active material.

2. Description of the Related Art

Various portable electronic devices such as camcorders, cell phones, and laptop computers have now been commercially available. Rapidly increasing demand for such devices involves further reductions in the size and weight of these devices. Such reductions require batteries, particularly secondary batteries, having a higher energy density for use as portable power sources. Currently, such batteries have been intensively researched and developed. Among them, lithium-ion secondary batteries, which involve doping and undoping with lithium ions, have a higher energy density than known aqueous electrolyte secondary batteries such as lead batteries, nickel-cadmium batteries, and nickel-hydrogen batteries. Lithium-ion secondary batteries are now in high demand; they are expected to expand their range of application with improving environmental resistance.

Examples of positive active materials that have been put to practical use in lithium-ion batteries include lithium-cobalt oxide and lithium-nickel oxide, which have a layered rock-salt structure, and lithium-manganese oxide, which has a spinel structure. These positive active materials have both advantages and disadvantages. At present, lithium-cobalt oxide is extensively used for its best-balanced characteristics such as capacity, cost, and thermal stability. On the other hand, lithium-manganese oxide has low capacity and slightly poor storage stability at high temperature. Also, lithium-nickel oxide has slightly low stability in crystal structure, poor cycle characteristics, and poor environmental characteristics, particularly high-temperature characteristics. However, lithium-manganese oxide and lithium nickel oxide, each providing less material cost and more stable supply than lithium-cobalt oxide, have been expected and researched.

Examples of known proposals involving lithium-nickel oxide include the partial replacement of nickel contained in the oxide with another element to improve the cycle characteristics (for example, see Japanese Unexamined Patent Application Publication Nos. H08-37007 and 2001-35492), the addition of a certain material such as a metal salt (for example, see Japanese Unexamined Patent Application Publication No. H07-192721), and the use of a certain binder in a positive mixture (for example, see Japanese Unexamined Patent Application Publication No. H10-302768). Investigation by the present inventors, however, shows that the above proposals cannot sufficiently improve the environmental characteristics, particularly the high-temperature characteristics.

Another proposal is the coating of a positive active material composed of lithium-nickel oxide with a single material such as a conductive material and another oxide having a layered structure (for example, see Japanese Unexamined Patent Application Publication Nos. H07-235292, H11-67209, H11-283623, and 2000-149950). Investigation by the present inventors shows that this proposal cannot improve the high-temperature characteristics of the positive active material.

A further proposal is the coating of a compound oxide of lithium and a transition metal with another compound (for example, see Japanese Unexamined Patent Application Publication Nos. H08-222219, 2000-149948, and 2002-164053). This proposal, which does not have the idea of using a mixture containing a carbonaceous material, cannot attain a sufficient effect.

As described above, the coating of a positive active material has been studied; however, this approach still has difficulty in significantly improving the high-temperature characteristics of nonaqueous electrolyte secondary batteries. Furthermore, a compound oxide of lithium and a transition metal, when used as a positive active material, raises the internal resistance of batteries due to its relatively poor electron conductivity. Unfortunately, the coating may further decrease the electron conductivity of the positive active material depending on the type of the coating material used.

SUMMARY OF THE INVENTION

To solve the above problems, the present invention provides a positive active material composed of a compound oxide of lithium and a transition metal to attain both good electron conductivity and excellent high-temperature characteristics. The present invention further provides a nonaqueous electrolyte secondary battery having excellent high-temperature characteristics using the positive active material.

Intensive studies by the present inventors have found that a positive active material composed of particles of a compound oxide of lithium and a transition metal and a coating layer of an inorganic compound and a carbonaceous material formed on each particle can prevent the decomposition of an electrolyte, attain good coatability, and ensure good electron conductivity. These studies have led to the conception of the present invention.

A positive active material according to the present invention is composed of particles of a compound oxide of lithium and a transition metal. This compound oxide has a layered structure. A coating layer of an inorganic compound and a carbonaceous material is formed on at least part of each surface of the particles.

This positive active material is prepared by coating the particles with a mixture of the inorganic compound and the carbonaceous material. The coating layers can prevent the contact between the compound oxide and an electrolyte in a nonaqueous electrolyte secondary battery. The compound oxide, therefore, does not decompose the electrolyte, thus improving the high-temperature characteristics of the nonaqueous electrolyte secondary battery. In addition, the carbonaceous material contained in the coating layers, having good electron conductivity, does not impair the transfer of electrons. Furthermore, the mixture of the inorganic compound and the carbonaceous material provides better coatability than, for example, the carbonaceous material alone. The coating layers of this mixture, therefore, can significantly improve cycle characteristics.

A nonaqueous electrolyte secondary battery according to the present invention is produced with a negative active material and a positive active material composed of particles of a compound oxide of lithium and a transition metal. This compound oxide has a layered structure. A coating layer of an inorganic compound and a carbonaceous material is formed on at least part of each surface of the particles.

In this nonaqueous electrolyte secondary battery, the coating layers prevent the compound oxide from decomposing an electrolyte and do not decrease the electron conductivity of the positive active material. The coating layers, therefore, can significantly improve the high-temperature characteristics.

DESCRIPTION OF THE PREFERRED EMBODIMENTS

Figure 1:
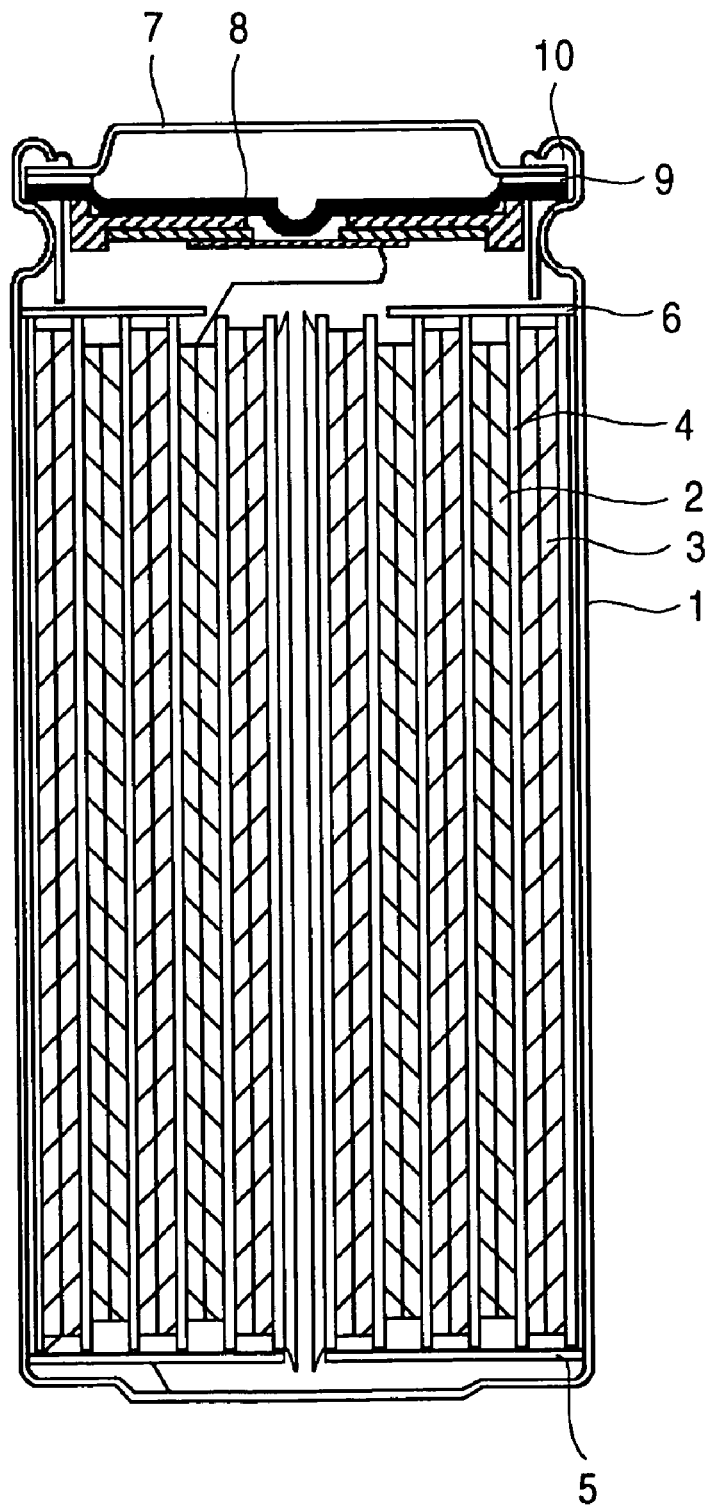
FIG. 1 is a longitudinal sectional view of an embodiment of nonaqueous electrolyte secondary batteries according to the present invention.

A positive active material according to the present invention will now be described. This positive active material is composed of particles of a compound oxide of lithium and a transition metal. This compound oxide has a layered structure. A coating layer of an inorganic compound and a carbonaceous material is formed on at least part of each surface of the particles.

Preferred examples of the compound oxide that can be used in the present invention include $LiCoO_2$ and $LiNi_{(1-x)}M_xO_2$, where $0.1 \leq x \leq 0.5$; and the element M is at least one material selected from the group consisting of iron (Fe), cobalt (Co), manganese (Mn), copper (Cu), zinc (Zn), chromium (Cr), vanadium (V), titanium (Ti), aluminum (Al), tin (Sn), boron (B), gallium (Ga), magnesium (Mg), calcium (Ca), and strontium (Sr). Such compound oxides, having a layered structure, can be doped and undoped with lithium. Alternatively, known types of compound oxides of lithium and a transition oxide may be used in which part of their constituent elements is replaced with another element.

The inorganic compound used for the coating layers may be a known material stable in a positive electrode. Examples of the inorganic compound used include lithium compound oxides other than for the compound oxide particles, conductive oxides, stable oxides such as aluminum oxide and magnesium oxide, various inorganic solid electrolytes, and inorganic salts such as phosphates (e.g., $LiFePO_4$) and sulfates. The effect of coating with these materials has been known. In particular, lithium compounds are preferred as the inorganic compound because they permit smooth transfer of lithium ions between the compound oxide particles and an electrolyte. Lithium compounds, therefore, can prevent the coating layers from decreasing the lithium-ion conductivity of the positive active material.

Various carbonaceous materials having electron conductivity may be used as the carbonaceous material used for the coating layers. Examples of such carbonaceous materials include known carbonaceous materials such as crystalline carbon typified by graphite, amorphous carbon, and carbon fiber.

The coating layers only need to be formed on at least part of the individual surfaces of the particles; preferably, these layers are formed on the overall surfaces of the individual particles to improve the high-temperature characteristics more reliably.

The weight ratio of the inorganic compound to the carbonaceous material contained in the coating layers ranges preferably between 99:1 and 60:40 to ensure both the electron conductivity and the high-temperature characteristics. If the ratio of the carbonaceous material is less than this range, the coating layers may exhibit insufficient electron conductivity, leading to a decrease in the performance of the positive active material. If, on the other hand, the ratio of the carbonaceous material is more than this range, the compound oxide particles may be insufficiently coated with the inorganic compound, leading to an unsatisfactory improvement in the high-temperature characteristics.

The weight ratio of the compound oxide particles to the coating layers, which are composed of the inorganic compound and the carbonaceous material, is preferably determined such that:

$$A:(B+C)=98:2 \text{ to } 70:30$$

where A indicates the weight of the compound oxide particles; B indicates the weight of the inorganic compound; and C indicates the weight of the carbonaceous material. This range ensures both the coatability of the particles and the lithium-ion conductivity. If the ratio of (B+C) is less than this range, the coating layers exhibit poor coatability, leading to an insufficient effect. If, on the other hand, the ratio of (B+C) is more than this range, the coating layers may impair the transfer of lithium ions, leading to a decrease in the performance of the positive active material.

The method of synthesizing the compound oxide is not particularly limited. For example, the compound oxide may be synthesized by mixing carbonates such as lithium carbonate, nickel carbonate, and manganese carbonate according to a desired composition and firing the mixture at 600° C. to 1100° C. in air or in an oxygen atmosphere. Alternatively, the compound oxide may be synthesized by mixing a compound hydroxide coprecipitated in an aqueous solution of, for example, an inorganic salt mainly containing nickel with lithium in the form of, for example, lithium hydroxide and firing the mixture in air or in an oxygen atmosphere. Furthermore, the compound oxide may be synthesized by any method that can provide the physical properties described above, such as solid-phase synthesis and hydrothermal synthesis. Examples of the material for the compound oxide include compound carbonates, organic salts, and oxides.

Also the method of synthesizing the inorganic compound is not particularly limited. Commercially available oxides or inorganic salts that are stable in a positive electrode may be directly used as the inorganic compound.

The compound oxide particles may be coated with the inorganic compound and the carbonaceous material by any method that enables the formation of coating layers having a desired composition. An example is a method of mixing the compound oxide particles, the inorganic compound or its precursor, and the carbonaceous material and coating the particles with the inorganic compound and the carbonaceous material by heat treatment. Another example is a method of applying a mechanical stress on particles of each component to coat the compound oxide particles with the inorganic compound and the carbonaceous material physically. A further example is a method of precipitating the inorganic compound and the carbonaceous material on the compound oxide particles by a wet process, as typified by a sol-gel process, before heat treatment.

The positive active material is, as described above, prepared by coating the compound oxide particles with the inorganic compound and the carbonaceous material. The coating layers can prevent the contact between the compound oxide and an electrolyte in a nonaqueous electrolyte secondary battery. The compound oxide, therefore, does not decompose the electrolyte, achieving improvements in the cycle characteristics and the environmental resistance, particularly, a significant improvement in the cycle characteristics at high temperature. In addition, the coating layers, containing the carbonaceous material, do not impair the transfer of electrons between the compound oxide particles and the electrolyte. The positive active material of the present invention, therefore, ensures sufficient electron conductivity and a significant improvement in the high-temperature characteristics in a nonaqueous electrolyte secondary battery.

An example of nonaqueous electrolyte secondary batteries produced using the above positive active material will now be described with reference to FIG. 1.

Referring to FIG. 1, a cylindrical nonaqueous electrolyte secondary battery is composed of a hollow, cylindrical battery can 1 accommodating an electrode roll. This electrode roll is formed by winding many times a positive electrode 2 of the positive active material in strip form, a negative electrode 3 of a negative active material in strip form, and a separator 4 having ion permeability and separating the positive electrode 2 and the negative electrode 3. The battery can 1 is composed of, for example, iron with nickel plating. An end of the battery can 1 is closed and the other end is open. A pair of insulating plates 5 and 6 is disposed at both ends of the electrode roll in the battery can 1.

A battery lid 7, a safety valve 8, and a positive temperature coefficient (PTC) element 9 are attached at the open end of the battery can 1 by crimping with a sealing gasket 10 to seal the battery can 1. The battery lid 7 is composed of, for example, the same material as for the battery can 1. The safety valve 8 is electrically connected to the battery lid 7 through the PTC element 9. The electrical connection between the battery lid 7 and the electrode roll is broken when the internal pressure of the battery exceeds a predetermined pressure due to, for example, an internal short circuit or heat from the outside. In response to a rise in temperature, the PTC element 9 increases its resistance to limit current, thereby preventing abnormal heat generation by high current. The sealing gasket 10 is composed of, for example, an insulating material coated with asphalt.

The positive electrode 2 is composed of, for example, a positive active material layer and a positive current collector. The positive current collector is composed of, for example, a foil of a metal such as aluminum. The positive active material layer contains, for example, the positive active material, a conductive agent such as graphite, and a binder such as polyvinylidene fluoride. In this embodiment, the positive active material is, as described above, composed of the compound oxide particles and the coating layers formed on at least part of the individual surfaces of the particles. The coating layers contain the inorganic compound and the carbonaceous material.

The negative electrode 3 may be composed of a material that can be electrochemically doped and undoped with lithium and that has a potential difference of, for example, 2.0 V or less from metallic lithium. Examples of the material for the negative electrode 3 include nongraphitizable carbon, artificial graphite, natural graphite, pyrolytic carbons, coke (for example, pitch coke, needle coke, and petroleum coke), graphites, glassy carbons, fired organic polymer compounds (which are organic polymer compounds, such as phenol resin and furan resin, carbonized by firing at a proper temperature), carbon fiber, activated carbon, and carbon black. The negative electrode 3 may also be composed of a metal that can form an alloy with lithium, its alloy, or an intermetallic compound. Alternatively, the negative electrode 3 may be composed of oxides, or other compounds such as nitrides, that can be doped and undoped with lithium at a relatively low potential. Examples of such compounds include iron oxide, ruthenium oxide, molybdenum oxide, tungsten oxide, titanium oxide, and tin oxide. Furthermore, the negative electrode 3 may be composed of metallic lithium or a lithium alloy.

The electrolyte may be any of a nonaqueous electrolytic solution prepared by dissolving an electrolyte salt in a nonaqueous solvent, a solid electrolyte containing an electrolyte salt, and a gel electrolyte prepared by impregnating an organic polymer with a nonaqueous solvent and an electrolyte salt.

The nonaqueous electrolytic solution is prepared from any combination of an organic solvent and an electrolyte. The organic solvent used may be any solvent for general use in this type of batteries. Examples of the organic solvent include propylene carbonate, ethylene carbonate, diethyl carbonate, dimethyl carbonate, 1,2-dimethoxyethane, 1,2-diethoxyethane, γ-butyrolactone, tetrahydrofuran, 2-methyltetrahidrofuran, 1,3-dioxolane, 4-methyl-1,3-dioxolane, diethyl ether, sulfolane, methylsulfolane, acetonitrile, propionitrile, anisole, acetates, butyrates, and propionates.

The solid electrolyte used may be any material that has lithium-ion conductivity. Examples of the solid electrolyte include inorganic solid electrolytes and solid polymer electrolytes. Inorganic solid electrolytes are exemplified by lithium nitride and lithium iodide. Solid polymer electrolytes are composed of an electrolyte salt and a polymer compound in which the electrolyte salt is dissolved. This polymer compound may be any simple substance, copolymer, or mixture of, for example, polyethers such as poly(ethylene oxide) and its cross-linked polymers, polymethacrylate esters, and polyacrylates.

The matrix for the gel electrolyte may be any polymer that can be gelatinized by absorbing the nonaqueous electrolytic solution. Examples of the matrix include fluoropolymers such as poly(vinylidene fluoride) and poly(vinylidene fluoride-co-hexafluoropropylene), polyethers such as poly(ethylene oxide) and its cross-linked polymers, and polyacrylonitrile. Among them, fluoropolymers are preferably preferred to attain redox stability. The electrolyte salt is added to the matrix to provide ion conductivity.

The electrolyte salt for the above electrolyte may be any material for general use in this type of batteries. Examples of the electrolyte salt include $LiClO_4$, $LiAsF_6$, $LiPF_6$, $LiBF_4$, $LiB(C_6H_5)_4$, $CH_3SO_3Li$, $CF_3SO_3Li$, $LiCl$, and $LiBr$.

The shape of the battery of the present invention is not particularly limited; for example, it may be cylindrical, rectangular, coin-shaped, button-shaped, or laminate-seal-shaped.

The negative electrode 3 and the positive electrode 2 for the battery of the present invention may be prepared by any method. An example is a method of mixing an electrode material with a solvent and, for example, a known binder and a known conductive material and applying the mixture onto a current collector. Another example is a method of mixing an electrode material with, for example, a known binder and applying the mixture onto a current collector with heating. A further example is a method of processing an electrode material alone or in combination with a conductive material and, if necessary, a binder by, for example, molding. The method for preparing the negative electrode 3 and the positive electrode 2 is not limited to these examples. Specifically, the negative electrode 3 and the positive electrode 2 may be prepared by mixing the material for the negative electrode 3 or the positive electrode 2 with, for example, a binder and an organic solvent to form a slurry, applying the slurry onto a current collector, and drying the applied slurry. Alternatively, irrespective of the presence of a binder, a stronger electrode may be prepared by molding an active material with pressure while heating the active material.

The method for preparing the battery of the present invention is not particularly limited. An example is a method of winding a positive electrode, a negative electrode, and a separator separating the positive electrode and the negative electrode around a core. Another example is a method of alternately laminating electrodes and separators. The present invention is also effective for a rectangular battery prepared by winding a positive electrode and a negative electrode.

In the nonaqueous electrolyte secondary battery of the present invention, as described above, the positive electrode 3 is prepared from the positive active material composed of the compound oxide particles and the coating layers formed on at least part of the individual surfaces of the particles. The coating layers contain the inorganic compound and the carbonaceous material. The coating layers can prevent the compound oxide from coming into contact with the electrolyte. The compound oxide, therefore, does not decompose the electrolyte, leading to a significant improvement in the cycle characteristics, particularly at high temperature. In addition, the coating layers, containing the carbonaceous material, ensure sufficient electron conductivity.

EXAMPLES

Examples of the present invention will now be described with reference to experimental results.
Sample 1
(Synthesis of Compound Oxide of Lithium and Transition Metal)

An aqueous solution of commercially available nickel nitrate and an aqueous solution of commercially available manganese nitrate were mixed such that the ratio of elemental nickel to elemental manganese was 7:3. Then, aqueous ammonium was added dropwise to the mixed solution with vigorous stirring to prepare a compound hydroxide. This compound hydroxide was mixed with lithium hydroxide. This mixture was fired in an oxygen atmosphere at 850° C. for ten hours and was pulverized to prepare a powder of lithium-nickel-manganese oxide. Measurement by laser diffractometry showed that the average particle diameter of this powder was 13 μm. In addition, measurement by X-ray diffractometry showed that a pattern given by this powder was similar to a pattern given by $LiNiO_2$ in ICDD 09-0063. This similarity proves that the powder had the same structure as $LINiO_2$, namely, a layered rock-salt structure. Furthermore, observation by scanning electron microscopy (SEM) showed that primary particles having a diameter of 0.1 to 5 μm aggregated to form spherical particles. This powder was to be used as the compound oxide described above in a step of coating the compound oxide particles.
(Synthesis of Inorganic Compound)

Commercially available lithium phosphate and ferrous phosphate were mixed such that the ratio of elemental lithium to elemental iron was 1:1. This mixture was fired in a nitrogen atmosphere at 600° C. for five hours and was pulverized to prepare a powder of lithium-iron phosphate. Measurement by laser diffractometry showed that the average particle diameter of this powder was 0.4 μm. Measurement by X-ray diffractometry showed that a pattern given by this powder corresponded to a pattern given by $LiFePO_4$ in ICDD 40-1499. This powder was to be used as the inorganic compound described above in the subsequent step.
(Premixing)

The carbonaceous material used was acetylene black. The inorganic compound and the carbonaceous material were premixed for use in the step of coating the compound oxide particles at the following weight ratio:

$$B:C=85:15$$

where B indicates the weight of the inorganic compound; and C indicates the weight of the carbonaceous material.
(Coating of Compound Oxide Particles)

Figure 2A:
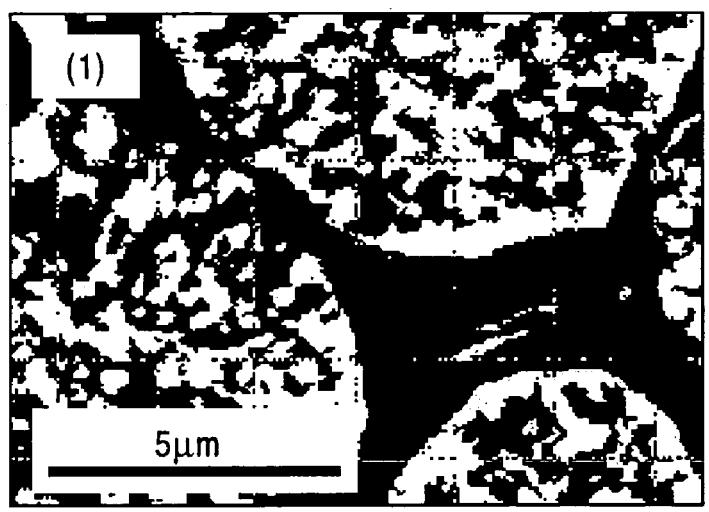
FIG. 2A is a secondary electron mapping by SEM of a positive active material of Sample 1.
Figure 2B:
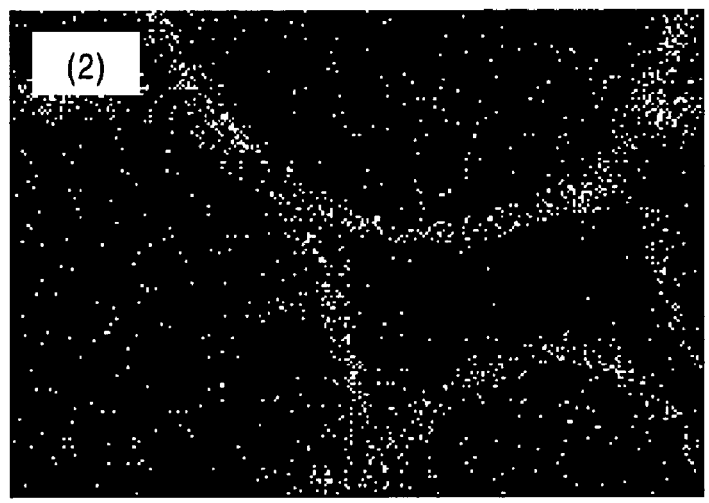
FIG. 2B is an element mapping by SEM of iron contained in the positive active material.
Figure 2C:
FIG. 2C is an element mapping by SEM of nickel contained in the positive active material.

The compound oxide and the mixture of the inorganic compound and the carbonaceous material were mixed at the following weight ratio:

$$A:(B+C)=90:10$$

where A indicates the weight of the compound oxide; and B and C are defined above. The resultant mixture was then processed with Mechanofusion® (AMS-LAB) manufactured by Hosokawa Micron Limited. This device is composed of a rotatable cylindrical container and fixed semicircular pillars arranged in parallel to the rotating axis along the inner wall of the container. This device presses a mixed powder against its inner wall by a centrifugal force to pass the powder through the gaps between the pillars and the inner wall. Then, a compressive and shear stress is applied on the powder, so that particles of one type adhere to particles of another type. In this embodiment, the inorganic compound and the carbonaceous material were allowed to adhere to the compound oxide while the gaps between the pillars and the inner wall were set to 3 to 8 mm and the linear velocity at which particles of the mixture were passed through the gaps was 15 to 25 m/m. Measurement by laser diffractometry showed that the average diameter of the resultant particles was 14 μm. In addition, the surfaces and cross sections of the particles were observed by SEM. FIG. 2A is a secondary electron mapping of the particles; FIG. 2B is an element mapping of iron contained in the particles; and FIG. 2C is an element mapping of nickel contained in the particles. These images show that a coating layer containing iron and having a thickness of 1 to 2 μm was formed on each spherical particle of the compound oxide, which mainly contains nickel, to constitute the resultant particles. Thus, a positive active material for use in Sample 1 was prepared.

A cylindrical battery was produced using this positive active material. Then, the cycle characteristics of the battery at high temperature were evaluated.

First, 86 percents by weight of the positive active material, 10 percents by weight of graphite, as a conductive material, and 4 percents by weight of polyvinylidene fluoride (PVDF), as a binder, were mixed and dispersed in N-methyl-2-pyrolidone (NMP) to prepare a positive mixed slurry. This slurry was uniformly applied on both surfaces of an aluminum foil strip having a thickness of 20 μm, was dried, and was compressed with a roller press to provide a positive electrode in strip form.

Next, 90 percents by weight of an artificial carbon powder and 10 percents by weight of PVDF were mixed and dispersed in NMP to prepare a negative mixed slurry. This slurry was uniformly applied on both surfaces of a copper foil strip having a thickness of 10 μm, was dried, and was compressed with a roller press to provide a negative electrode in strip form.

The positive electrode, the negative electrode, and a porous polyolefin film separator that separates the positive electrode and the negative electrode were wound many times to prepare an electrode roll. This electrode roll was accommodated in an iron battery can plated with nickel. Then, insulating plates were provided on the top and bottom ends of the electrode roll. An aluminum positive lead from the positive current collector was welded to a protrusion of a safety valve electrically connected to a battery lid. On the other hand, a nickel negative lead from the negative current collector was welded to the bottom of the battery can.

Subsequently, a nonaqueous electrolytic solution was prepared by dissolving $LiPF_6$ in a mixed solution of ethylene carbonate and methyl ethyl carbonate at a volume ratio of 1:1 such that the concentration of $LiPF_6$ was 1 mol/dm$^3$.

This nonaqueous electrolytic solution was injected into the battery can accommodating the electrode roll. The battery can, the safety valve, a PTC element, and the battery lid were crimped with an insulating sealing gasket to produce a cylindrical battery having an external diameter of 18 mm and a height of 65 mm.

This battery was evaluated for initial capacity and the percentage of residual capacity to the initial capacity. The initial capacity was measured after a charge at a charging voltage of 4.20 V and a charging current of 1 A at 45° C. for 2.5 hours and a successive discharge at a discharging current of 2 A and a final voltage of 2.75 V. Subsequently, the percentage of residual capacity to the initial capacity was measured with the charging capacity of the battery after the 100th cycle of the charge and discharge.

Sample 2

A nonaqueous electrolyte secondary battery was produced in the same way as in Sample 1, except that the inorganic compound used was commercially available lithium phosphate ($Li_3PO_4$). As in Sample 1, the percentage of residual capacity of this battery was evaluated at 45° C.

Sample 3

A nonaqueous electrolyte secondary battery was produced in the same way as in Sample 1, except that the inorganic compound used was $LiAlO_2$. This $LiAlO_2$ was prepared by mixing lithium hydroxide and aluminum hydroxide at a ratio of 1:1, firing the mixture in a nitrogen atmosphere at 1,000° C. for five hours, and pulverizing the fired mixture. As in Sample 1, the percentage of residual capacity of this battery was evaluated at 45° C.

Sample 4

A nonaqueous electrolyte secondary battery was produced in the same way as in Sample 1, except that the inorganic compound used was $Li_4Ti_5O_{12}$. This $Li_4Ti_5O_{12}$ was prepared by mixing commercially available anatase ($TiO_2$) and lithium hydroxide at a ratio of 4:5, respectively, firing the mixture in a nitrogen atmosphere at 800° C. for five hours, and pulverizing the fired mixture. As in Sample 1, the percentage of residual capacity of this battery was evaluated at 45° C.

Sample 5

A nonaqueous electrolyte secondary battery was produced in the same way as in Sample 1, except that the inorganic compound used was commercially available α-alumina ($Al_2O_3$). As in Sample 1, the percentage of residual capacity of this battery was evaluated at 45° C.

Sample 6

A nonaqueous electrolyte secondary battery was produced in the same way as in Sample 1, except that the inorganic compound used was commercially available anatase ($TiO_2$).

As in Sample 1, the percentage of residual capacity of this battery was evaluated at 45° C.

Sample 7

A nonaqueous electrolyte secondary battery was produced in the same way as in Sample 1, except that the inorganic compound used was commercially available magnesium oxide (MgO). As in Sample 1, the percentage of residual capacity of this battery was evaluated at 45° C.

Sample 8

A nonaqueous electrolyte secondary battery was produced in the same way as in Sample 1, except that the positive active material was prepared from the compound oxide and the inorganic compound without the carbonaceous material. As in Sample 1, the percentage of residual capacity of this battery was evaluated at 45° C.

Sample 9

A nonaqueous electrolyte secondary battery was produced in the same way as in Sample 1, except that the positive active material was prepared from the compound oxide without the inorganic compound and the carbonaceous material. As in Sample 1, the percentage of residual capacity of this battery was evaluated at 45° C.

The measurement results of the percentage of residual capacity of Samples 1 to 9 are shown in Table 1 below.

TABLE 1

| | Inorganic compound | Ratio of inorganic compound (B) to carbonaceous material (C) (B:C) | Residual capacity [%] |
|---|---|---|---|
| Sample 1 | $LiFePO_4$ | 85:15 | 93.2 |
| Sample 2 | $Li_3PO_4$ | 85:15 | 92.5 |
| Sample 3 | $LiAlO_2$ | 85:15 | 92.6 |
| Sample 4 | $Li_4Ti_5O_{12}$ | 85:15 | 94.0 |
| Sample 5 | $Al_2O_3$ | 85:15 | 85.1 |
| Sample 6 | $TiO_2$ | 85:15 | 87.3 |
| Sample 7 | MgO | 85:15 | 84.7 |
| Sample 8 | $LiFePO_4$ | 100:0 | 72.4 |
| Sample 9 | Nothing | — | 70.2 |

These results confirmed that the positive active materials containing the compound oxide particles and the coating layers formed on at least part of the individual surfaces of the particles could significantly improve the high-temperature characteristics. In addition, the batteries of Samples 1 to 4 exhibited even higher residual capacities than the battery of Sample 5, which contained α-alumina ($Al_2O_3$) as the inorganic compound, the battery of Sample 6, which contained anatase ($TiO_2$) as the inorganic compound, and the battery of Sample 7, which contained magnesium oxide (MgO) as the inorganic compound. These results show that the inorganic compound used is preferably a lithium compound.

Then, the optimum weight ratio of the inorganic compound to the carbonaceous material contained in the coating layers was examined.

Sample 10

A nonaqueous electrolyte secondary battery was produced in the same way as in Sample 1, except that the inorganic compound (B) and the carbonaceous material (C) were premixed such that B:C=99:1 by weight. As in Sample 1, the percentage of residual capacity of this battery was evaluated at 45° C.

Sample 11

A nonaqueous electrolyte secondary battery was produced in the same way as in Sample 1, except that the inorganic compound (B) and the carbonaceous material (C) were premixed such that B:C=70:30 by weight. As in Sample 1, the percentage of residual capacity of this battery was evaluated at 45° C.

Sample 12

A nonaqueous electrolyte secondary battery was produced in the same way as in Sample 1, except that the inorganic compound (B) and the carbonaceous material (C) were pre-mixed such that B:C=60:40 by weight. As in Sample 1, the percentage of residual capacity of this battery was evaluated at 45° C.

Sample 13

A nonaqueous electrolyte secondary battery was produced in the same way as in Sample 1, except that the inorganic compound (B) and the carbonaceous material (C) were pre-mixed such that B:C=99.5:0.5 by weight. As in Sample 1, the percentage of residual capacity of this battery was evaluated at 45° C.

Sample 14

A nonaqueous electrolyte secondary battery was produced in the same way as in Sample 1, except that the inorganic compound (B) and the carbonaceous material (C) were pre-mixed such that B:C=55:45 by weight. As in Sample 1 the percentage of residual capacity of this battery was evaluated at 45° C.

The measurement results of the percentage of residual capacity of Samples 10 to 14 are shown in Table 2 below, which also includes the result of Sample 1 for reference.

TABLE 2

|  | Inorganic compound | Ratio of inorganic compound (B) to carbonaceous material (C) (B:C) | Ratio of compound oxide (A) to (B + C) [A:(B + C)] | Residual capacity [%] |
| --- | --- | --- | --- | --- |
| Sample 1 | LiFePO$_4$ | 85:15 | 90:10 | 93.2 |
| Sample 10 | LiFePO$_4$ | 99:1 | 90:10 | 90.5 |
| Sample 11 | LiFePO$_4$ | 70:30 | 90:10 | 93.5 |
| Sample 12 | LiFePO$_4$ | 60:40 | 90:10 | 89.7 |
| Sample 13 | LiFePO$_4$ | 99.5:0.5 | 90:10 | 75.4 |
| Sample 14 | LiFePO$_4$ | 55:45 | 90:10 | 73.1 |

These results show that the weight ratio of the inorganic compound to the carbonaceous material ranges preferably between 99:1 and 60:40.

Then, the optimum weight ratio of the compound oxide to the coating layers (the inorganic compound and the carbonaceous material) was examined.

Sample 15

A nonaqueous electrolyte secondary battery was produced in the same way as in Sample 1, except that the compound oxide (A), the inorganic compound (B), and the carbonaceous material (C) were mixed in the step of preparing composite particles such that A:(B+C)=98:2 by weight. As in Sample 1, the percentage of residual capacity of this battery was evaluated at 45° C.

Sample 16

A nonaqueous electrolyte secondary battery was produced in the same way as in Sample 1, except that the compound oxide (A), the inorganic compound (B), and the carbonaceous material (C) were mixed in the step of preparing composite particles such that A:(B+C)=80:20 by weight. As in Sample 1, the percentage of residual capacity of this battery was evaluated at 45° C.

Sample 17

A nonaqueous electrolyte secondary battery was produced in the same way as in Sample 1, except that the compound oxide (A), the inorganic compound (B), and the carbonaceous material (C) were mixed in the step of preparing composite particles such that A:(B+C)=70:30 by weight. As in Sample 1, the percentage of residual capacity of this battery was evaluated at 45° C.

Sample 18

A nonaqueous electrolyte secondary battery was produced in the same way as in Sample 1, except that the compound oxide (A), the inorganic compound (B), and the carbonaceous material (C) were mixed in the step of preparing composite particles such that A:(B+C)=99:1 by weight. As in Sample 1, the percentage of residual capacity of this battery was evaluated at 45° C.

Sample 19

A nonaqueous electrolyte secondary battery was produced in the same way as in Sample 1, except that the compound oxide (A), the inorganic compound (B), and the carbonaceous material (C) were mixed in the step of preparing composite particles such that A:(B+C)=65:35 by weight. As in Sample 1, the percentage of residual capacity of this battery was evaluated at 45° C.

The measurement results of the percentage of residual capacity of Samples 15 to 19 are shown in Table 3 below, which also includes the result of Sample 1 for reference.

TABLE 3

|  | Inorganic compound | Ratio of inorganic compound (B) to carbonaceous material (C) (B:C) | Ratio of compound oxide (A) to (B + C) [A:(B + C)] | Residual capacity [%] |
| --- | --- | --- | --- | --- |
| Sample 1 | LiFePO$_4$ | 85:15 | 90:10 | 93.2 |
| Sample 15 | LiFePO$_4$ | 85:15 | 98:2 | 91.0 |
| Sample 16 | LiFePO$_4$ | 85:15 | 80:20 | 93.0 |
| Sample 17 | LiFePO$_4$ | 85:15 | 70:30 | 88.8 |
| Sample 18 | LiFePO$_4$ | 85:15 | 99:1 | 71.6 |
| Sample 19 | LiFePO$_4$ | 85:15 | 65:35 | 78.6 |

These results show that the weight ratio of the compound oxide to the coating layers (the inorganic compound and the carbonaceous material) ranges preferably from 98:2 to 70:30.

What is claimed is:

1. A positive active material comprising:
   base particles comprising lithium-nickel-manganese oxide; and
   a mixture consisting of an inorganic compound and a carbonaceous material on substantially the entire surface of the base particles;
   wherein,
   a weight ratio of the lithium-nickel-manganese oxide to the mixture is between 98:2 to 70:30 and is represented by the formula A:(B+C),
   A is the weight of the lithium-nickel-manganese oxide,
   B is the weight of the inorganic compound,
   C is the weight of the carbonaceous material, and
   the inorganic compound is a compound oxide of at least one selected from the group of LiFePO$_4$ and Li$_3$PO$_4$.

2. The positive active material according to claim 1, wherein the weight ratio of the inorganic compound to the carbonaceous material ranges between 99:1 and 60:40.

3. A nonaqueous electrolyte secondary battery comprising:
a negative active material;
a positive active material comprising base particles that include lithium-nickel-manganese oxide;
a nonaqueous electrolyte between the negative and positive active materials; and
a mixture consisting of an inorganic compound and a carbonaceous material on substantially the entire surface of the base particles; and
wherein,
a weight ratio of the compound oxide to the mixture is between 98:2 to 70:30 and is represented by the formula A:(B+C),
A is the weight of the lithium-nickel-manganese oxide,
B is the weight of the inorganic compound,
C is the weight of the carbonaceous material, and
the inorganic compound is a compound oxide of at least one selected from the group of $LiFePO_4$ and $Li_3PO_4$.

4. The positive active material according to claim 3, wherein the weight ratio of the inorganic compound to the carbonaceous material ranges between 99:1 and 60:40.

* * * * *